Jan. 14, 1964  G. E. LINNERT ETAL  3,117,861
STAINLESS STEEL AND ARTICLE
Filed Nov. 14, 1956  3 Sheets-Sheet 1

10X

10X

INVENTORS
George E. Linnert
Ronald H. Espy
BY 
THEIR ATTORNEY

Jan. 14, 1964  G. E. LINNERT ETAL  3,117,861
STAINLESS STEEL AND ARTICLE
Filed Nov. 14, 1956  3 Sheets-Sheet 2

INVENTORS
George E. Linnert
Ronald H. Espy

BY

THEIR ATTORNEY

INVENTORS
George E. Linnert
Ronald H. Espy
BY
THEIR ATTORNEY

United States Patent Office 3,117,861
Patented Jan. 14, 1964

3,117,861
STAINLESS STEEL AND ARTICLE
George E. Linnert, Timonium, and Ronald H. Espy, Randallstown, Md., assignors to Armco Steel Corporation, a corporation of Ohio
Filed Nov. 14, 1956, Ser. No. 622,115
7 Claims. (Cl. 75—124)

Our invention relates to the precipitation-hardenable chromium-nickel-aluminum stainless steels and to welded articles fashioned of the same.

Among the objects of our invention is the provision of a precipitation-hardenable chromium-nickel-aluminum stainless steel which readily may be welded with the inert-gas tungsten arc technique in rapid, reliable and efficient manner to give a sound, gas-free weld of strength and durability.

Another object is the provision of a steel of the character noted, and various welded articles and products fashioned of the steel possessing sound, tough and strong welds or welded joints therein, free of porosity.

A further object is the provision of an effective and reliable method for improving the physical characteristics and the appearance of welded precipitation-hardened austenitic chromium-nickel-aluminum stainless steel articles and products.

Other objects of our invention in part will be apparent from the description which follows and in part particularly pointed out below.

Our invention accordingly consists in the combination of elements, composition of ingredients and mixtures of materials and in the welds and welded articles, products and devices fashioned thereof, all as described herein, the scope of the application of which is indicated in the claims at the end of this specification.

In the several views of the accompanying drawings, in which we illustrate certain features of our invention:

As conducive to a better understanding of certain features of our invention, it may be noted at this point that the precipitation-hardenable austenitic chromium-nickel-aluminum stainless steels are finding great favor in the arts. These steels form the subject of U.S. Patents 2,505,762, 2,505,763, 2,505,764 and 2,506,558, issued to George N. Goller, all on May 2, 1950. They commonly analyze about 16% to 18% chromium, 6.50% to 7.75% nickel, .75% to 1.50% aluminum, with carbon .09% max., manganese 1.00% max., silicon 1.00% max., phosphorus .040% max., sulphur .030% max., and balance iron.

The steels noted are finding particular favor in the aircraft industries because of their great strength and the high ratio of strength to weight which they possess, a strength which is retained even at substantially elevated temperatures, i.e., temperatures up to 800° F. The steel in the form of sheet, extruded shapes, castings, various machine parts, is employed for the skin ribs, tail assembly, formed structural frames, engine supports, burner supports, various power plant parts such as compressor blading, shafting, bolts, nozzles, washers and the like, in jet aircraft. And in the fabrication and assembly of the aircraft many of the parts are welded frequently using for this purpose the inert-gas tungsten arc welding technique.

In welding the steel, particularly when using the inert-gas tungsten arc technique at substantial welding speeds, i.e., on the order of 25 inches per minute, substantial porosity is found within the region where weld and parent metal meet, that is the sides of the weld bead. This porosity appears as a multiplicity of minute pockets and is inclined to develop areas of weakness. Particularly, the points of porosity established are inclined to cause local stress concentration and ultimate deterioration.

Now the object of our invention is to overcome the difficulties noted above and give a precipitation-hardenable austenitic chromium-nickel-aluminum stainless steel which is weldable by the inert-gas tungsten arc technique, as well as other techniques, in rapid, reliable, efficient manner to give a sound weld free of porosity.

Figure 1:
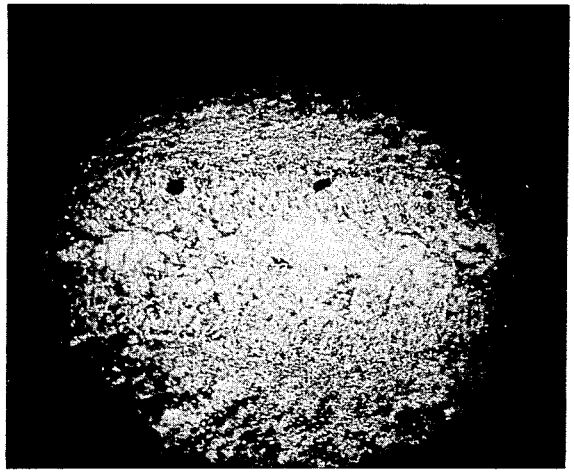
FIG. 1 is a section through a weld of the chromium-nickel-aluminum stainless steel of the prior art at 10× magnification.

Referring then more particularly to the practice of our invention, we have discovered that in the welding of the precipitation-hardenable chromium-nickel-aluminum stainless steels, especially by way of the inert-gas tungsten arc technique, there are encountered a substantial number of non-metallic inclusions within the region where the weld bead meets the base metal being welded. Actually, these non-metallic inclusions are initially present in the base metal. It is our thought that under the intense heat of the welding arc and the high temperatures reached in the weld metal, certain of these non-metallic inclusions at the sides of the weld are decomposed, yielding gas, a portion of which is there entrapped as the bead solidifies. Gas pockets are formed, giving the objectionable points of porosity. This is rather forcefully illustrated in FIG. 1 of the accompanying drawing where the section of welded metal discloses five internal porous spots along the upper junction of weld bead and base metal.

Our investigations lead us to feel that the objectionable non-metallic inclusions are aluminum nitrides or perhaps aluminum carbonitrides. We find that stainless steel whether melted in the induction furnace or melted in the electric arc furnace picks up nitrogen on the order of 0.02% to 0.06%, this as a result of the melting operation. And it combines with the aluminum, where present. It is this nitrogen gas which appears with the decomposition of the aluminum nitrides or the carbonitrides and gives rise to the difficulty.

We have discovered that by adding a certain critical amount of titanium to the composition of the precipitation-hardenable austenitic chromium-nickel-aluminum stainless steel, the objectionable porosity in welding is markedly and sharply reduced. We prepared a series of heats of 17–7 precipitation-hardenable chromium-nickel-aluminum stainless steel in the induction furnace, these with differing titanium contents. And the metal, when made up in the form of sheet and welded along its length, revealed differing numbers of points of porosity in unit length. The analyses of the several heats and the porosity rating in terms of the average number of porous points per inch for the total number of inches welded is given in Table I which follows:

TABLE I

*Summary of Weld Porosity on Induction Furnace Heats of 17–7 Precipitation-Hardenable Austenitic Chromium-Nickel-Aluminum Stainless Steel of Differing Titanium Contents*

| Heat No. | C | Mn | P | S | Si | Cr | Ni | Al | Ti | $N_2$ | Porosity Rating, Pts./in. | Total Inches Welded |
|---|---|---|---|---|---|---|---|---|---|---|---|---|
| 1 | .066 | .59 | .008 | .011 | .45 | 17.12 | 7.13 | 1.33 | <.010 | .051 | .680 | 48 |
| 2 | .071 | .82 | .008 | .010 | .56 | 17.52 | 7.11 | 1.57 | .01 | .036 | .180 | 48 |
| 3 | .072 | .79 | .008 | .010 | .56 | 17.57 | 7.15 | .87 | .05 | .035 | .150 | 48 |
| 4 | .074 | .73 | .010 | .011 | .43 | 17.19 | 7.19 | 1.28 | .07 | .031 | .150 | 48 |
| 5 | .075 | .73 | .009 | .011 | .50 | 17.16 | 7.17 | 1.38 | .07 | .036 | .009 | 103 |
| 6 | .067 | .74 | .010 | .011 | .47 | 17.19 | 7.15 | 1.08 | .13 | .050 | .120 | 48 |

It will be noted from the data given in Table I that the porosity rating of the precipitation-hardenable chromium-nickel-aluminum stainless steel is markedly reduced with the addition of a small amount of titanium, that is, titanium on the order of 0.01%. And that with 0.05% titanium, 0.07% titanium and 0.13% titanium a minimum porosity is had, even where the aluminum content in the several samples ranges from .87% to 1.57% and the nitrogen content from 0.031% to 0.050%. This length of the weld in each case is seen to be sufficient to provide a good average porosity figure.

Moreover, in furtherance of our investigations we had prepared a series of commercial heats of precipitation-hardenable chromium-nickel-aluminum stainless steel of differing titanium contents and two with zirconium instead of titanium. These were made into sheet and samples were taken and welded. A count was made of the points of porosity along the length of weld with results reported in Table II below:

TABLE II

*Summary of Weld Porosity Tests on Commercial Heats of 17–7 Precipitation-Hardenable Stainless Steel of Differing Titanium Contents or Zirconium Contents*

| Heat | C | Mn | P | S | Si | Cr | Ni | Al | Ti | Zr | Porosity Rating, Pts./In. | Total Inches Welded |
|---|---|---|---|---|---|---|---|---|---|---|---|---|
| A | .066 | .62 | .025 | .009 | .45 | 16.78 | 7.17 | .97 | .006 |  | 1.11 | 1,669 |
| B | .074 | .73 | .027 | .005 | .50 | 16.83 | 7.47 | 1.12 | .007 |  | .50 | 56 |
| C | .080 | .78 | .026 | .010 | .53 | 17.38 | 7.04 | 1.09 | .034 |  | .51 | 419 |
| D | .070 | .65 | .024 | .016 | .46 | 17.16 | 7.02 | 1.08 | .030 |  | .49 | 90 |
| E | .069 | .71 | .021 | .008 | .39 | 17.45 | 7.18 | 1.10 | .025 |  | .28 | 690 |
| F | .066 | .55 | .022 | .012 | .48 | 17.04 | 7.05 | 1.25 | .037 |  | .27 | 159 |
| G | .065 | .91 | .019 | .011 | .45 | 16.90 | 7.15 | 1.10 | .040 |  | .15 | 90 |
| H | .069 | .61 | .019 | .009 | .36 | 17.19 | 7.21 | 1.17 | .050 |  | .34 | 180 |
| I | .070 | .71 | .020 | .009 | .29 | 17.15 | 7.13 | 1.18 | .050 |  | .21 | 90 |
| J | .071 | .74 | .019 | .006 | .28 | 17.01 | 7.27 | 1.30 | .060 |  | .11 | 690 |
| K | .075 | .74 | .021 | .009 | .35 | 16.85 | 7.31 | 1.24 |  | .12 | .23 | 48 |
| L | .072 | .77 | .020 | .010 | .53 | 17.02 | 7.39 | 1.22 |  | .12 | .01 | 60 |

Figure 2:
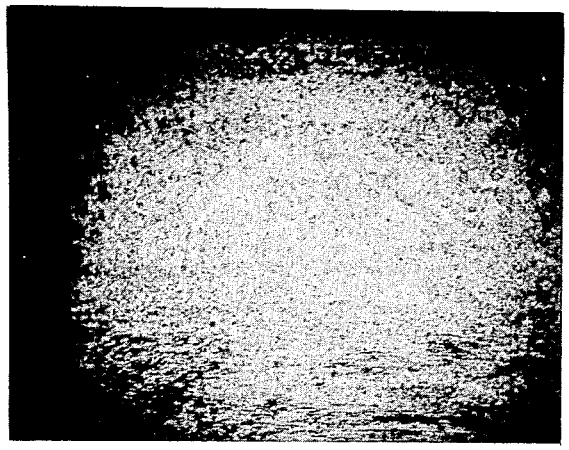
FIG. 2 is a like section through a weld of our improved austenitic chromium-nickel-aluminum stainless steel also at 10× magnification.
Figure 2:
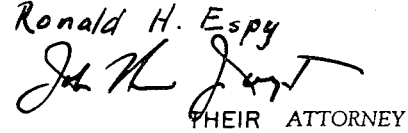
Figures 4A, 4B:
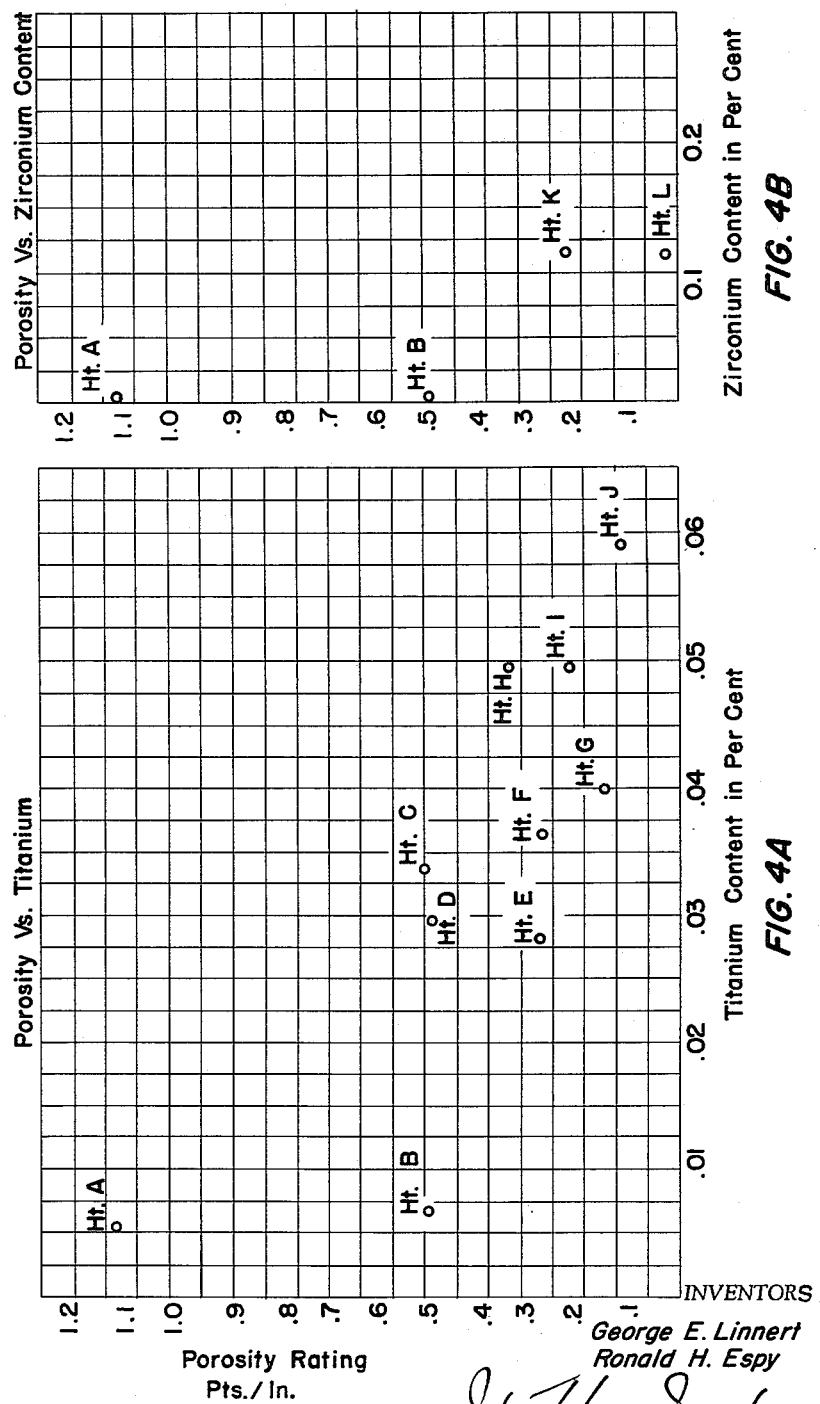
FIGS. 4A and 4B are graphs showing the critical relationship between weld porosity and composition of that steel.

It will be seen that the average number of porous points per inch of weld length sharply falls as the titanium content exceeds 0.01% and is consistently low with a titanium content of about 0.05%. And in like way the same is true in the steels bearing zirconium instead of titanium. All of this is forcefully revealed in FIGS. 4A and 4B of the drawings, based on the data of Table II, graphically depicting the respective effects of the titanium and zirconium additions of the rate of porosity occurrence in the tungsten arc welding of the 17–7 precipitation-hardenable stainless steels. The porosity rating, in terms of the average number of porous points per inch of weld length, is given as a function of the titanium content in one case and the zirconium content in the other. And the quality of the weld is typically illustrated in FIG. 2 of the drawing. The particular section there shown is free of porosity. Moreover, the non-metallic inclusions appearing at the edge of the weld bead are smaller than those in prior art weld of FIG. 1.

While we usually prefer to employ either titanium or zirconium in our steel we may employ uranium in place of these, in substantially greater weight, however, and cost.

Figure 3:
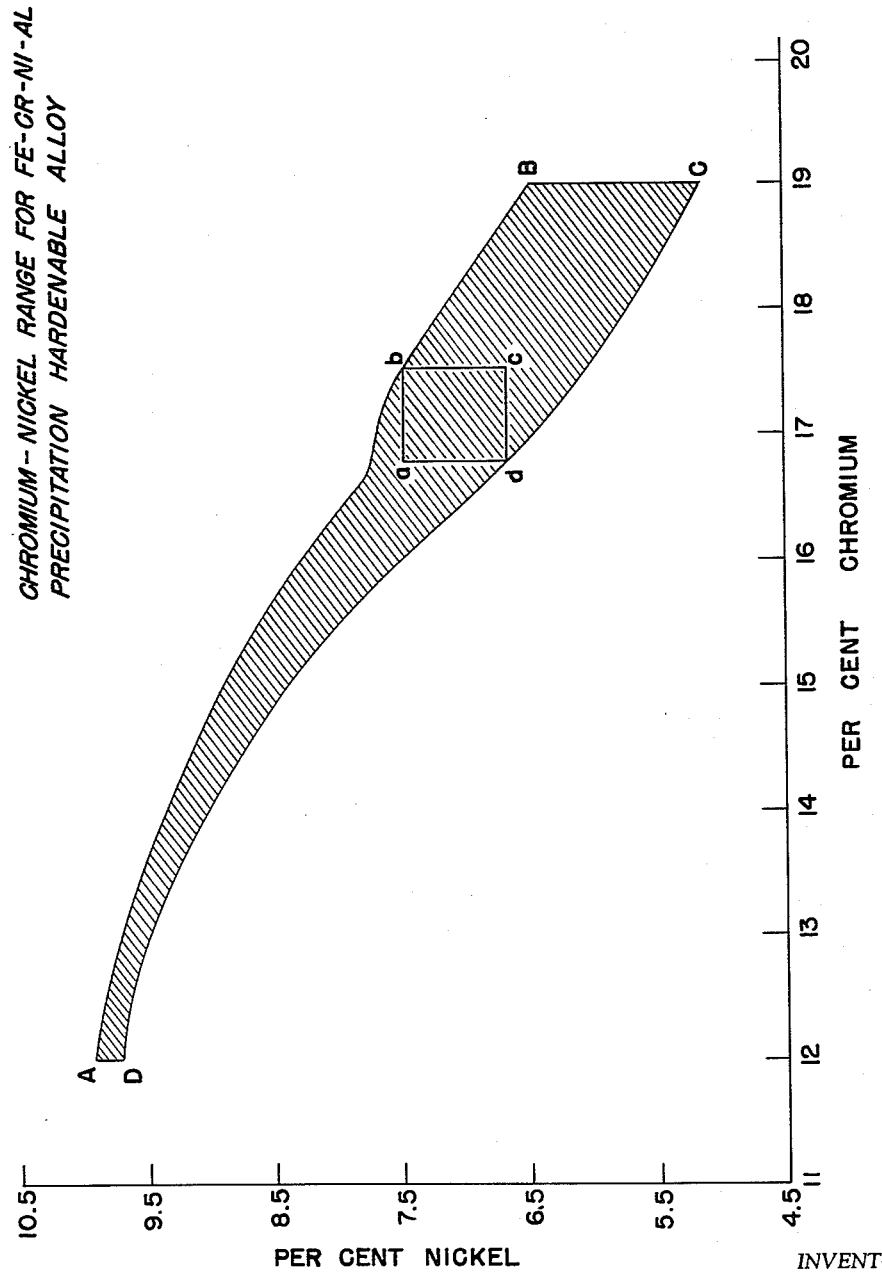
FIG. 3 is a diagram showing the relationship between the chromium content and the nickel content of the steel of our invention.

The precipitation-hardenable austenitic chromium-nickel-aluminum stainless steel of our invention preferably analyzes chromium about 16.00% to 18.00%, nickel about 6.50% to 7.75%, aluminum .75% to 1.50%, carbon about .09% max., at least one of the group titanium about .05% to .20%, zirconium about .10% to .40% and uranium about .30% to 1.00%, and the remainder iron with usual impurities and additions not subversive to the properties of hardenability, weldability, strength and the like as referred to above. More especially our steel analyzes chromium about 16.90% to 17.65%, nickel about 6.75% to 7.50%, carbon about .08% max., aluminum 1.00% to 1.35%, either titanium about .05% to .20% or zirconium .10% to .40%, and remainder substantially all iron. Where desired, however, a broader range of chromium and nickel may be employed, this as set forth in FIG. 3 of the accompanying drawings with aluminum from about .75% to 1.50%, and one of the ingredients titanium, zirconium or uranium in the amount of at least about .05% titanium, at least about .10% zirconium and at least about .30% uranium. And the steel additionally may include molybdenum up to 6%, the chromium content being decreased by like amount, however. Where employed, the molybdenum content preferably amounts to about 1% to 4% and the chromium is decreased a like percentage.

In the melting of our precipitation-hardenable austenitic chromium-nickel-aluminum stainless steel the titanium addition frequently is made by way of ferrotitanium. And ordinarily it is added to the ladle rather than to the furnace. We prefer, however, to employ pure titanium pellets rather than the ferrotitanium; sponged titanium metal in pelletized form is somewhat cheaper than commercial ferrotitanium. Although the titanium addition may of course be made to the furnace, recoveries are not as good as where addition is made to the ladle. While the ladle addition gives a recovery of about 50%, the recovery for the furnace addition is more nearly on the order of 25%.

The precipitation-hardenable austenitic chromium-nickel-aluminum stainless steel of our invention readily lends itself to welding by known welding techniques, including that of the inert-gas tungsten arc techniques in rapid and effective manner to achieve a weld which is virtually free of internal porosity.

While in the steels of our invention we prefer to employ a titanium content of at least about 0.05% and a zirconium content of at least about 0.10%, we find that the amount of titanium or of zirconium may be substantially increased. In general, however, it is not desirable to employ a titanium content exceeding about 0.20%, nor a zirconium content exceeding about 0.40%, because greater contents than necessary to combine with the original nitrogen in the melt provide the potential for forming additional inclusions. An excessive amount of titanium usually oxidizes upon contact with the air and gives dirty metal. Additionally, it frequently causes the formation of a scum on the stream of metal as it is teemed, with consequent scum entrapment within the skin of the resulting ingots. Within the range of 0.05% up to 0.20%, however, we find no adverse effect of the titanium content either in melting, teeming or in welding. In the welded metal we find little evidence of oxidation and scum formation as a result of the titanium content.

Thus it will be seen that we provide in our invention a precipitation-hardenable chromium-nickel-aluminum stainless steel of improved welding characteristics in which there are achieved the objects set forth above together with many practical advantages. The steel of improved weldability is achieved with reliability and at minimum expense. Not only is there had a weldable steel free of porosity in welding, but there is had a steel in which the inclusions appearing in the welding operations are much less objectionable to the eye than in the precipitation-hardenable aluminum-bearing steels of the prior art.

Inasmuch as many possible embodiments may be made of our invention and inasmuch as many changes may be made in the embodiments hereinbefore set forth, it will be understood that all matter described herein or shown in the accompanying drawing is to be interpreted as illustrative and not as a limitation.

We claim as our invention:

1. Stainless steel possessing precipitation-hardening and good welding characteristics consisting essentially of chromium and nickel according to ABCD of FIG. 3 of the accompanying diagram, molybdenum up to about 6% with the chromium content being decreased in like amount where molybdenum is present, aluminum about .75% to 1.50%, carbon about .10%, at least one of the group consisting of titanium at least about .05%, zirconium at least about .10% and uranium at least about .30%, and the remainder substantially all iron.

2. Stainless steel possessing precipitation-hardening and good welding characteristics consisting essentially of chromium 16.00% to 18.00%, nickel 6.50% to 7.75%, aluminum .75% to 1.50%, carbon .09% maximum, at least one of the group consisting of titanium about .05% to .20%, zirconium about .10% to .40% and uranium about .30% to 1.00%, and the remainder substantially all iron.

3. Stainless steel possessing precipitation-hardening and good welding characteristics consisting essentially of chromium 16.90% to 17.65%, nickel 6.75% to 7.50%, carbon .08% maximum, aluminum 1.00% to 1.35%, titanium about .05% to .20%, and the remainder substantially all iron.

4. Stainless steel possessing precipitation-hardening and good welding characteristics consisting essentially of chromium 16.90% to 17.65%, nickel 6.75% to 7.50%, carbon .08% maximum, aluminum 1.00% to 1.35%, zirconium about .10% to .40%, and the remainder substantially all iron.

5. A welded article comprising precipitation-hardenable stainless steel, and a fusion weld, the stainless steel consisting essentially of molybdenum about 1% to 4%, chromium and nickel according to ABCD of FIG. 3 of the accompanying diagram, with the exact chromium content decreased by about the amount of the molybdenum present, aluminum about .75% to 1.50%, carbon about .10%, at least one of the group consisting of titanium about .05% to .20%, zirconium about .10% to .40%, and uranium about .30% to 1.0%, and the remainder substantially all iron.

6. A welded article comprising precipitation-hardened stainless steel, and a fusion weld, said stainless steel consisting essentially of chromium 16.00% to 18.00%, nickel 6.50% to 7.75%, aluminum .75% to 1.50%, carbon .09% maximum, at least one of the group consisting of titanium about .05% to .20%, zirconium about .10% to .40%, and uranium about .30% to 1.00%, and the remainder substantially all iron.

7. The art of improving the arc welding qualities of the aluminum-bearing precipitation-hardenable austentic chromium-nickel stainless steels of chromium and nickel contents according to ABCD of FIG. 3 of the accompanying drawing and aluminum in the amount of about .75% to 1.50%, by adding to the composition of the steel at least one ingredient of the group consisting of titanium about .05% to .20%, zirconium about .10% to .40%, and uranium about .30% to 1.00%.

References Cited in the file of this patent

UNITED STATES PATENTS

| | | |
|---|---|---|
| 2,505,762 | Goller | May 2, 1950 |
| 2,505,763 | Goller | May 2, 1950 |
| 2,505,764 | Goller | May 2, 1950 |
| 2,506,558 | Goller | May 2, 1950 |
| 2,564,498 | Nisbet | Aug. 14, 1951 |
| 2,597,173 | Patterson | May 20, 1952 |
| 2,738,267 | Pakkala | Mar. 13, 1956 |

FOREIGN PATENTS

| | | |
|---|---|---|
| 407,052 | Great Britain | Mar. 9, 1934 |